Oct. 19, 1965 N. LAING 3,212,735
THRUST MEANS FOR POWERING AIRCRAFT
Filed Oct. 3, 1963 6 Sheets-Sheet 1

INVENTOR
Nikolaus Laing
BY
ATTORNEYS

INVENTOR
Nikolaus Laing

United States Patent Office 3,212,735
Patented Oct. 19, 1965

3,212,735
THRUST MEANS FOR POWERING AIRCRAFT
Nikolaus Laing, 35–37 Hofener Weg, Aldingen, near Stuttgart, Germany
Filed Oct. 3, 1963, Ser. No. 313,503
Claims priority, application Germany, Dec. 7, 1956, L 26,395
3 Claims. (Cl. 244—73)

This invention relates to aircraft, and particularly (though not exclusively) to light aircraft. This application is a continuation-in-part of application No. 148,287 filed October 27, 1961, now abandoned, itself a continuation-in-part of application No. 701,643 filed December 9, 1957, now Patent No. 3,161,348 dated December 15, 1964.

Hitherto slow and medium-speed aircraft have been driven by propellers, which in effect are large-diameter single-stage axial blowers. One main reason for this is that the internal-combustion engine driven propeller is a readily controllable means of producing a large volume of air moving at a speed relative to the aircraft which gives good efficiency at the aircraft speeds in question. Engine-driven propellers are, however, not without their disadvantages, as is well known: perhaps the chief of these is the disturbance of the airflow over the wings, when the engines are placed there, or the obstruction to the slipstream presented by the fuselage, when the engine is in the nose. Single-engine aircraft have additional disadvantages due to propeller torque and so forth. The propeller is moreover a source of danger when the aircraft is on the ground: though this may not matter much with large aircraft and well organized airfields, it is an important consideration with private flying, small aircraft and small airfields, which are considered to be the chief application of the present invention.

The main object of the invention is to provide a slow or medium-speed aircraft having a means of propulsion other than the conventional engine-driven propeller, which obviates certain of the disadvantages associated therewith, and which gives rise to design possibilities not available when using engine-driven propellers.

The invention accordingly provides an aircraft having a fuselage; a power unit supported on the fuselage; blower means including a rotor, means mounting the rotor on the fuselage for rotation about an axis located in a vertical longitudinal plane and lying at a substantial angle to the horizontal, means operatively connecting the rotor to the power unit to be driven thereby, said rotor comprising a series of blades extending over the length of the rotor and arranged in a ring about the axis to define an interior space clear of stationary guides, said blower means further comprising guide means extending the length of the rotor in spaced relation thereto and defining an inlet and an outlet, said guide means co-operating with the rotor on rotation thereof to induce a flow of air from the inlet through the path of the rotating blades to said interior space and thence again through the path of the rotating blades to the outlet, the rotor discharging directly through the outlet to provide thrust to the aircraft.

The cross-flow blower that is, comprising a rotor and guide means as just mentioned, has been the subject of occasional patents (e.g. the Dalin British Patent No. 291,007) but so far as I know was not commercially used in recent times for any purpose and had not been the subject of much research. I have, however, found that this blower is capable of a large throughput at the sort of velocities which can be utilized for aircraft propulsion. I strongly prefer to use not just any cross-flow blower, such as that of the specification just mentioned, but an improved form of such blower which I have assisted in developing and in which a portion of the guide means is so formed that a vortex is created upon rotation of the rotor which has a core region interpenetrating the rotor blades, the guide means being at all points well spaced from the periphery of the rotor e.g. by more than one-third the radial blade depth.

The invention will be further described with reference to the accompanying diagrammatic drawings in which certain embodiments of the invention are illustrated by way of example only. In the drawings.

In what follows there will first be described a preferred form of blower: two aircraft incorporating this blower will then be described. In this way it will not be necessary to interrupt the description of the aircraft to go into detail over the blower.

Figure 1:
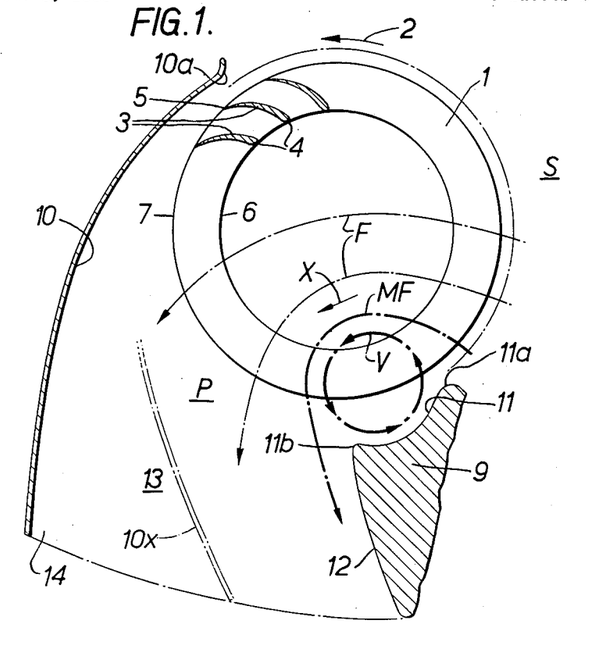
FIGURE 1 is a cross-section of a preferred form of blower for use in an aircraft according to the invention.

Referring now to the drawings, the blower diagrammatically shown in FIGURE 1 comprises a drum-shaped rotor designated generally 1 having its interior clear of obstruction, which rotor is mounted, by means not shown, for rotation about the axis of the drum and driven at a predetermined speed in the direction of the arrow 2, also by means not shown. The rotor 1 is provided with blades 3 extending longitudinally and having inner and outer edges 4, 5 lying on inner and outer cylindrical envelopes indicated at 6, 7. The blades are concave facing in the direction of rotation, and have their outer edges leading their inner edges. The blades 3 are of airfoil shape, with their inner edges 4 forming the "thick" portion of the airfoil.

Guide means are provided adjacent the rotor 1 and comprise a guide body 9 and a guide wall 10 both extending the length of the rotor and defining a suction region S and a pressure region P. The body 9 provides a main guide wall portion 11 which converges with the rotor 1 in the direction of rotor rotation down to a line 11a of nearest approach to the rotor which lies spaced therefrom by more than one-third of the blade depth measured radially. The wall portion 11 is concave to the rotor and extends over only a very small arc thereof (in fact it subtends at the axis of the rotor an arc of less than 20°).

The guide body 9 provides also an outlet wall portion 12 which fairs into the main guide wall portion 11 and which defines therewith an angle of approximately 90°: where they meet the wall portions 11 and 12 define a more or less rounded nose 11b.

The guide wall 10 diverges steadily from the rotor 1 with increasing radius of curvature, going from a line of nearest approach to the rotor 10a which lies approximately diametrally opposite the line 11a of nearest approach of the guide wall portion 11 and which is also spaced from the rotor 1 by more than one-third of the radial blade depth. The guide wall 10 defines with the outlet wall portion 12 of the body 9 a diverging outlet 13 which forms a diffuser having an arcuate median line.

The ends of the blower are closed off by walls 14.

Figure 2:
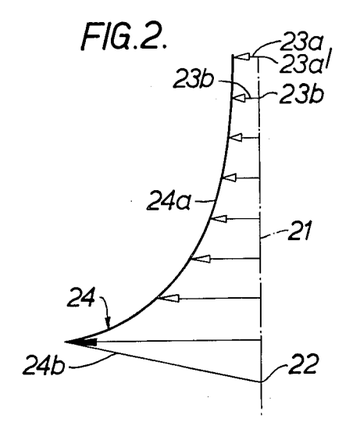
FIGURE 2 is a graph showing, as ordinates, air velocities in the blower of FIGURE 1.

In operation of the FIGURE 1 blower a Rankine vortex is set up, the core of which is eccentric to the rotor axis, and indicated by the flow lines shown chain dotted at V; the whole throughput flows from the suction region S through the path of the rotating rotor blades 3 to the interior of the rotor and thence again through the path of the rotating blades to the pressure side of the rotor: flow takes place in a direction always perpendicular to the rotor axis and as indicated in general direction only by the chain dotted flow lines F, MF. FIGURE 2 shows the distribution of velocity in the vortex. The chain dotted line 21 represents a diameter of the rotor taken through the axis 22 of the vortex core V. Velocity of fluid at points on the line 21 by reason of the vortex is indicated by the horizontal lines 23a, 23b, etc., the length of each line 23a, 23b etc. being a measure of the velocity at the point 23a', 23b', etc. respectively. The envelope of these lines is shown by the curve 24, which has two portions, one 24a approximately a rectangular hyperbola and the other, 24b, a straight line. The curve 24a relates to the field region of the vortex and the curve 24b to the core: it will be understood that the curves are those of an ideal or "mathematical" Rankine vortex and actual flow conditions will only approximate to these curves.

The core of the vortex is a whirling mass of air with no transitional movement as a whole, and velocity diminishes going from the periphery of the core to its axis 22. The core V intersects the inner blade envelope. The vortex core V is a region of low pressure, and the location of the core can be discovered by investigation of pressure distribution within the rotor. Although for convenience the vortex core V has been shown circular and has been regarded as possessing an axis, the core will usually not be truly circular.

The velocity profile of the fluid at the second entrance thereof to the rotor blades will be that of the vortex. In the ideal case of FIGURE 2 this profile will be that of the Rankine vortex there shown by curves 24a, 24b: in an actual case the profile will still have the general character of a Rankine vortex. Thus, there will be in the region of the periphery of the core V a flow tube of high velocity indicated at MF in FIGURE 1 by the heavier chain dots while the flow tubes remote from the periphery of the core will have a very much smaller velocity.

It will be appreciated that much the greater amount of air flows in the flow tubes in the region of maximum velocity. With a given construction the physical location of the flow tube MF is fairly closely defined. Therefore, in the restricted zone of the rotor blades 3 through which this flow tube MF passes, the relative velocity between blades and fluid is much higher than it would be in a flow machine which, following the principles adhered to hitherto in the art, was designed for a rectangular velocity profile end uniform loading of the blades in the zones thereof where fluid passes.

In the restricted blade zones through which the flow tube MF passes there will be much less separation and energy loss than if that tube flowed at the average velocity of throughput taken over the whole area of the zone of the blades through which fluid can pass, that is, transfer of momentum to the fluid occurs under excellent conditions. The transfer of momentum in the flow tubes travelling below the average velocity will be poorer, but on balance there is a substantial gain.

It will be seen that ideally the maximum velocity flow tube MF undergoes a change of direction of about 180° in passing through the interior of the rotor. Including the traversals of the blades the change of direction will then exceed 180°. This change in flow direction is not, of course, attended by losses such as would occur on similar change of direction in a duct. As will be understood, this change in direction of flow is something which has to be taken account of when designing an aircraft incorporating the FIGURE 1 blower.

It is particularly to be noted that the major part of the throughput (represented by the flow tube MF) passes through the path of the rotating rotor blades where they have a component of velocity in a direction opposite to the main direction of flow within the rotor, as shown by the arrow X.

Figure 3:
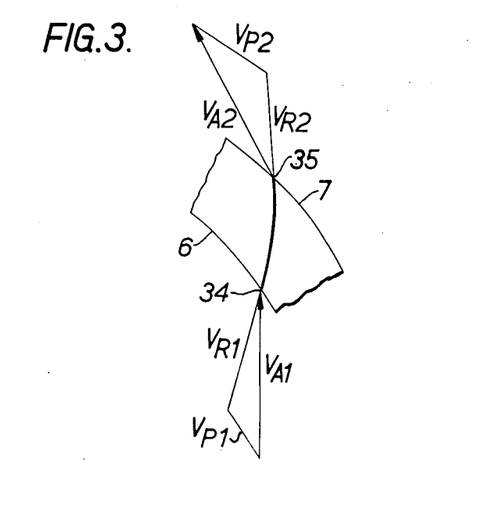
FIGURE 3 is a vector diagram showing air velocity at the inner and outer edges of a blade in the FIGURE 1 blower.

A vector diagram is shown in FIGURE 3 for the velocities at the points 34 and 35 where the maximum velocity flow tube MF intersects inner and outer envelopes 6, 7 of the blades 3. In the diagram $V_{P1}$ is the peripheral velocity of the inner edge of the blade 3 at the point 34, $V_{A1}$ the absolute velocity of the air in the flow tube MF at the point 34, and $V_{R1}$ the velocity of that air relative to the blade as found by completing the triangle. The direction of the vector $V_{R1}$ coincides with that of the blade at its inner edge and fluid enters the blade without shock. Similarly, $V_{P2}$, $V_{A2}$ and $V_{R2}$ respectively represent the peripheral velocity, the absolute velocity of the air, and the velocity of the air relative to the blade, at the point 35 on the outer edge of blade 3. It is considered that the blade angles and blade curvature determine the character of the vortex, while the position of the vortex core is determined by means of the guide body 9 and more particularly by the main guide wall portion 11 thereof. It is considered that in a given case the particular blade angles and blade curvature, depend on the following parameters among others: the diameter of the blades, the depth of a blade in radial direction, the density and viscosity of the fluid, the disposition of the external guide body and the rotational speed of the rotor, as well as on the ratio between overall pressure and back pressure. These parameters must be adapted to correspond to the operating conditions ruling in a given case. In order to get optimum results in a given case quite definite blade angles and shape have to be adopted.

It is to be appreciated that while FIGURE 1 shows what will commonly be found the most practical and efficient form of guide body, many variations can be made in its form while still preserving the preferred vortex flow which has been described. Thus, the guide body may simply be a rounded nose, or may define a parallel gap with the rotor: passages may be formed in the guide body to convey a portion of the flow on the pressure side so as to improve the vortex formation. Though it will normally be preferred to have the guide body well spaced from the rotor, even this is not always necessary.

FIGURE 1 does not show the manner in which the blades 3 are supported, but it will be understood that in a simple construction these may be held between end discs carrying stub shafts journaled in fixed bearings. It is preferred to have the interior completely unobstructed, as shown in FIGURE 1, but it may sometimes be desirable (as shown later) to run a supporting shaft through the rotor: provided the shaft diameter is not excessive, satisfactory operation is still obtained. The rotor blades 3 may be skewed if desired; this assists torque transmission by the blades since the forces set up by the torque have components longitudinally of the skewed blades and do not have to be transmitted by shear only.

Figure 4:
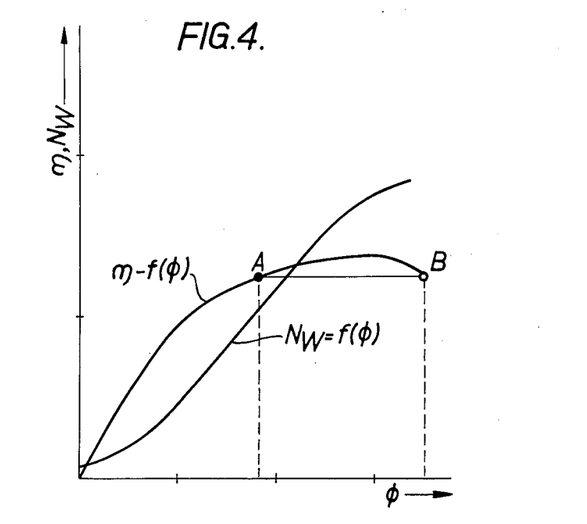
FIGURE 4 is a graph illustrating the performance of the FIGURE 1 blower and in which shaft power $N_w$ and efficiency $\eta$ are plotted as ordinates against throughput $\phi$.

In FIGURE 4, $\eta$ and $N_w$ are represented as ordinates and $\phi$ as abscissae. These symbols are defined as follows:

$$\eta = \frac{\text{energy added to the throughput}}{\text{shaft power taken by blower}}$$

$N_w$ = shaft power taken by blower $$\phi = \frac{\text{throughput per unit time}}{\text{effective surface of rotor} \times \text{peripheral speed of rotor}}$$

(As will be understood, $\eta$ is efficiency and $\phi$ is a dimensionless number representative of the throughput per unit time.)

The $\eta/\phi$ and $N_w/\phi$ curves shown in FIGURE 4 relate to the blower as described with reference to FIGURES 1 to 3.

The first main point of interest is that as throughput is throttled to zero, so the power taken diminishes to nearly zero: this contrasts with axial flow blowers where throttling does not substantially reduce, and may even increase, the power taken.

The second main point of interest is the flat top of the $\eta/\phi$ curve showing a wide working range between the points A, B.

The degree of throttling in a blower as shown in FIGURES 1 to 3 can readily be varied by modification of the vortex. For this purpose the core region V can be displaced: alternatively, or in addition, it can be expanded as by adjustment of the shape and/or position of the guide member 9. Throttling can be modified by moving the guide wall 10 towards or away from the guide body 9, for which purpose it may be pivoted adjacent its line 10a of nearest approach to the rotor: in FIGURE 1 there is shown in chain lines 10x a position of the guide wall 10 in which it is pivoted towards the body 9 to partially throttle the blower. Alternatively, provision may be made for closing off the air intake to the rotor.

By varying the throttling the blower can be adapted to the variation of the coefficient $\eta$ which diminishes with increasing altitude, without any change in the speed of the blower.

The efficiency of the above described blower is lower than that of large airscrews, and is approximately equal to that of small airscrews. The reason for this is that the correlation of the vectors described by reference to FIGURE 3 with the flow lines of the vortex field can be an optimum only within a narrow entry and exit region and although this accounts for the major part of the flow it does not account for all of it.

Attention is particularly drawn to the fact that in the blower described the velocity of the outflowing air is much greater than the peripheral velocity of the blades, due to the effect of the vortex. The blower is thus to be distinguished from blowers where the blades act simply as paddle wheels and induce a flow which cannot have a velocity greater than the peripheral blade velocity.

Attention is also directed to the simplicity of the mechanical parts of the blower, and particularly to the fact that general spacing is recommended at the lines of nearest approach of the guide means, on both sides of the rotor. Manufacture of the blower does not therefore, involve the sort of design problems and expense which are associated with close tolerances. Moreover, the blower is able without excessive rigidity of its parts to accommodate minor relative movement thereof, due to stressing of the aircraft, vibration or even minor damage: since the blower is, therefore, not unduly delicate it may safely be used on aircraft.

The rotor of the above-described blower can, of course, in principle be of any desired length. However, the spacing mentioned facilitates the design of a long rotor.

FIGURES 5 to 8 illustrate an ultra-light aircraft propelled by cross-flow blowers preferably designed on the principles set forth above.

Figures 5, 6, 7:
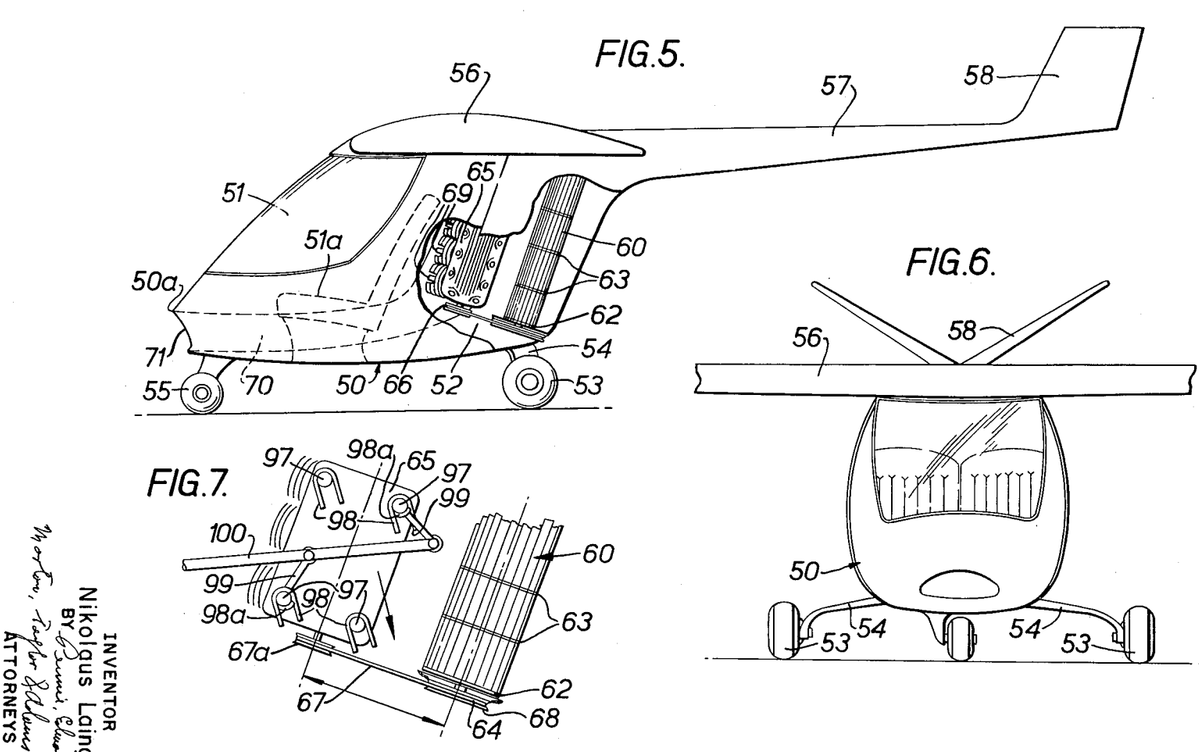
FIGURE 5 aircraft taken through the body thereof and cording to the invention, with parts cut away.
FIGURE 6 is a front elevation of the FIGURE 5 aircraft, with the wings cut off.
FIGURE 7 is a schematic side elevation showing a motor and blower rotor and illustrating the motor mounting.
Figure 8:
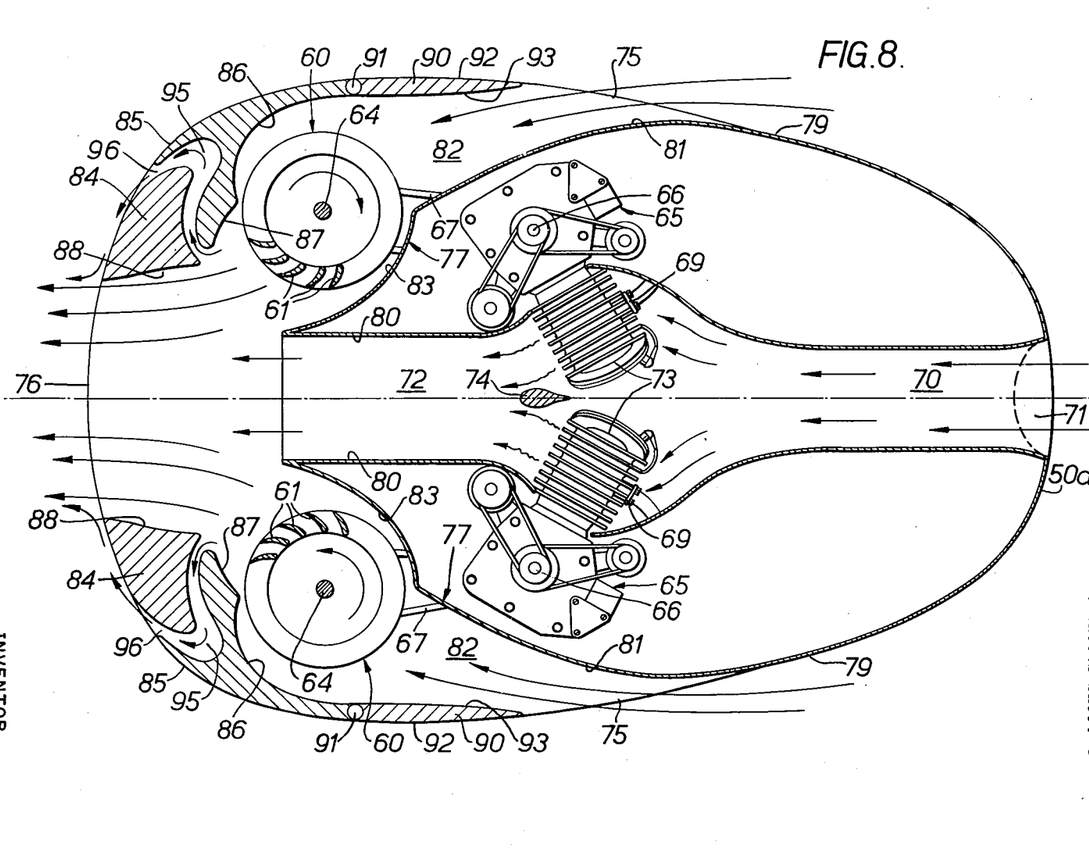
FIGURE 8 is a horizontal cross-sectional view of the FIGURE 5 aircraft taken through the body thereof and showing the motors and blowers.

The aircraft comprises a cabin or body 50 divided transversely to provide a forward-facing passenger compartment 51 with two seats 51a and, at the rear of this compartment, a machinery compartment 52. The body 50 carries a non-retractable tricycle undercarriage comprising two main wheels 53 mounted on laterally-extending arms 54 at the rear of the body and a third wheel 55 centrally disposed at its nose 50a. An over-wing structure 56 of conventional type is connected to the upper part of the body 50 which carries also a boom 57 extending rearwardly at the level of the wing structure and terminating in a tail plane 58.

Within the machinery compartment 52 two similar blower rotors 60 are mounted for rotation about axes contained in vertical planes and extending upwardly and rearwardly at an angle of some 20° to the vertical. The rotors 60 extend over substantially the whole height of the body 50 and are positioned symmetrically to either side of the central vertical plane thereof. Each rotor 60 comprises a series of similar blades 61 of airfoil profile arranged as described with reference to FIGURE 1: these blades are supported on end discs 62 and a series of intermediate discs 63 spaced apart along and secured to a shaft 64 which extends through the rotor and is mounted on bearings (not shown) at either end. The rotors 60 are independently driven by a pair of similar high-speed air-cooled internal combustion engines 65 disposed with their crankshafts 66 parallel to the axes of the rotors 60. Drive is transmitted from each engine 65 to the corresponding rotors 60 by means of a V-belt 67 which runs over a pulley 67a (FIGURE 7) on the lower end of the engine crankshaft 66 and over a slightly larger diameter pulley 68 on the lower end of the rotor shaft 64. The engines 65 are of the multi-cylinder in-line type, with their cylinders 69 projecting symmetrically into a central duct 70 (FIGURES 5 and 8) for cooling air extending from front to rear through the body 50. The duct 70 receives air from a central inlet opening 71 at the base of the nose 50a and extends through the passenger compartment 51 at a low level and under the seats 51a thereof and up past the engine cylinders 69 whence the cooling air discharges rearwardly between the rotors 60 (as will be further described) through a parallel walled exit duct portion 72 extending over the whole length of the rotors. The engine cylinders 69 lie at an angle to the central vertical plane so as to present their heads 73 to air flow in the duct 70: a pear-sectioned rod 74 situated between the cylinder heads 73 on the downstream side thereof helps to direct air leaving the cylinders into the exit duct portion 72.

The rotors 60 receive air from individual inlets 75 symmetrically arranged one at either side of the aircraft body 50, and discharge into a common outlet 76 centrally disposed at the rear of the body, the inlets and the outlet all extending over the whole length of the rotors. Casings 77 enclosing the crankcases 78 and ancillary gear of the engines 65 fair into the side wall surfaces 79 of the aircraft body 50 adjacent the inlets 73 and terminate at the walls 80 defining the sides of the exit duct portion 72. These casings 77 each provide a side wall 81 of an inlet passageway 82 leading from the corresponding inlet 75 to the corresponding rotor 60, and also an outlet wall 83 therefor which corresponds in shape and functions to the guide wall 10 described with reference to FIGURE 1 and helps to lead flow from the rotor 60 towards the common outlet 76. Rear corner portions 84 of the aircraft body 50 provide rounded external surfaces 85 fairing with the side wall surfaces 79 of the aircraft body 50 and internal surfaces including, for each portion 84, a side wall portion 86 for the corresponding inlet passageway 82, a main guide portion 87 facing the corresponding rotor 60 and an outlet wall portion 88; the guide portions and outlet wall portions correspond in shape and function to the walls designated 11 and 12 in FIGURE 1 and the two outlet wall portions, which converge slightly in the direction of air flow, define the previously mentioned common outlet 76 from the rotors. A flap or door 90 is pivotally mounted at 91 at the forward outer extremity of each rear corner portion 84. In its normal operating position illustrated, the flap 90 presents an outer surface 92 fairing with the corresponding side wall surface 79 of the body and the external surface 85 of the rear corner portion 84, and an inner surface 93 fairing into and providing an extension of the wall portion 86. It will be seen that the inlet passageway 82 for each rotor 60, as defined by the wall 81 provided by the casing 77 and the wall portions 86 and 93 provided respectively by the rear corner portion 84 and flap, diverges somewhat towards the rotor so as to act as a diffuser.

A bleed 95 is formed in each of the rear corner portions 84 to take air from the pressure side of the corresponding rotor 60 and discharge it through a slot 96 over the outer surface 85 in the direction in which, in operation of the aircraft, ambient air will flow thereover, whereby to minimize breakaway of the boundary layer at a position at which it would otherwise be most likely to occur.

The engines 65 are each mounted by means of studs 97 (FIGURE 7) projecting therefrom and received snugly in straps 98 of inverted U-formation fixed in parallel relation to one another in the aircraft body 50. Arcuate brackets 98a projecting from arms 99 articulated to a control lever 100, one for each engine, are arranged to hold the studs 97 firmly against the bights of the straps 98 so that in normal operation each engine is securely located. If one engine 65 fails, this arrangement permits the engine to be jettisoned by actuating the lever 100 to rotate the brackets 98a around the studs 97 to positions where they no longer provide support for these studs, whereupon they fall out of the straps.

In normal operation of the aircraft, each rotor 60 co-operates with its adjacent guide surfaces in the general manner described with reference to FIGURES 1 to 3. The correspondence between the various parts and surfaces illustrated in FIGURE 8 and those of FIGURE 1 has already been pointed out and there will be no need to repeat here the description given earlier. Air enters the inlet passageways 82 with substantially the velocity of the aircraft, but a proportion of the velocity energy is converted to pressure because of the diffuser effect of the passageways, thereby increasing the mass throughput. Additional velocity is imparted to the air by the rotors 60, which discharge directly rearwardly through the outlet 76. Cooling air enters the duct 70 therefor by the ram effect, and discharges directly rearwardly through the duct portion 72 and outlet 76. The flow from the rotors 60 exerts an ejector effect upon flow through the duct 70, while that flow increases the total mass of air leaving the outlet. While the air leaving the outlet 76 has a main component of velocity in the horizontal plane, it has also a minor lift-producing vertical component. The flaps or doors 90 can be closed when the aircraft is in a glide. If an engine 65 fails, it can be jettisoned by operation of the lever 100 under control of the pilot: this is believed necessary to enable continued level flight on one engine.

It will be seen that the slipstream in no way interferes with the airfoil surfaces as in wing-mounted propeller aircraft heretofore, nor does the presence of the fuselage interfere with airflow to or from the blowers as in conventional aircraft with nose-mounted propellers. The propulsion forces are symmetrical and without the torque and other effects commonly associated with single propeller aircraft. By using two engines in the aircraft body it is possible to continue flight on failure of one engine, with the propulsion forces still almost symmetrical. Finally, the passengers have an unobstructed view and the dangers associated with revolving propellers on the ground are entirely eliminated.

Figure 9:
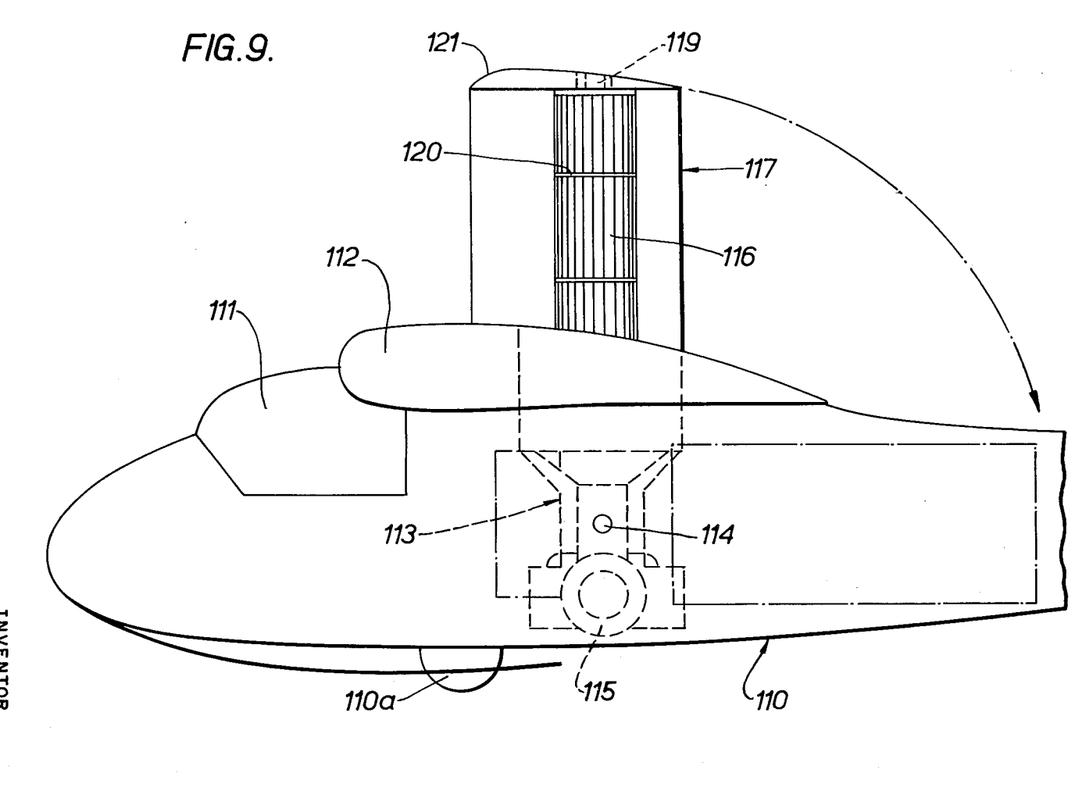
FIGURE 9 is a side elevation of a power-assisted glider with the tail not shown.
Figures 10, 11:
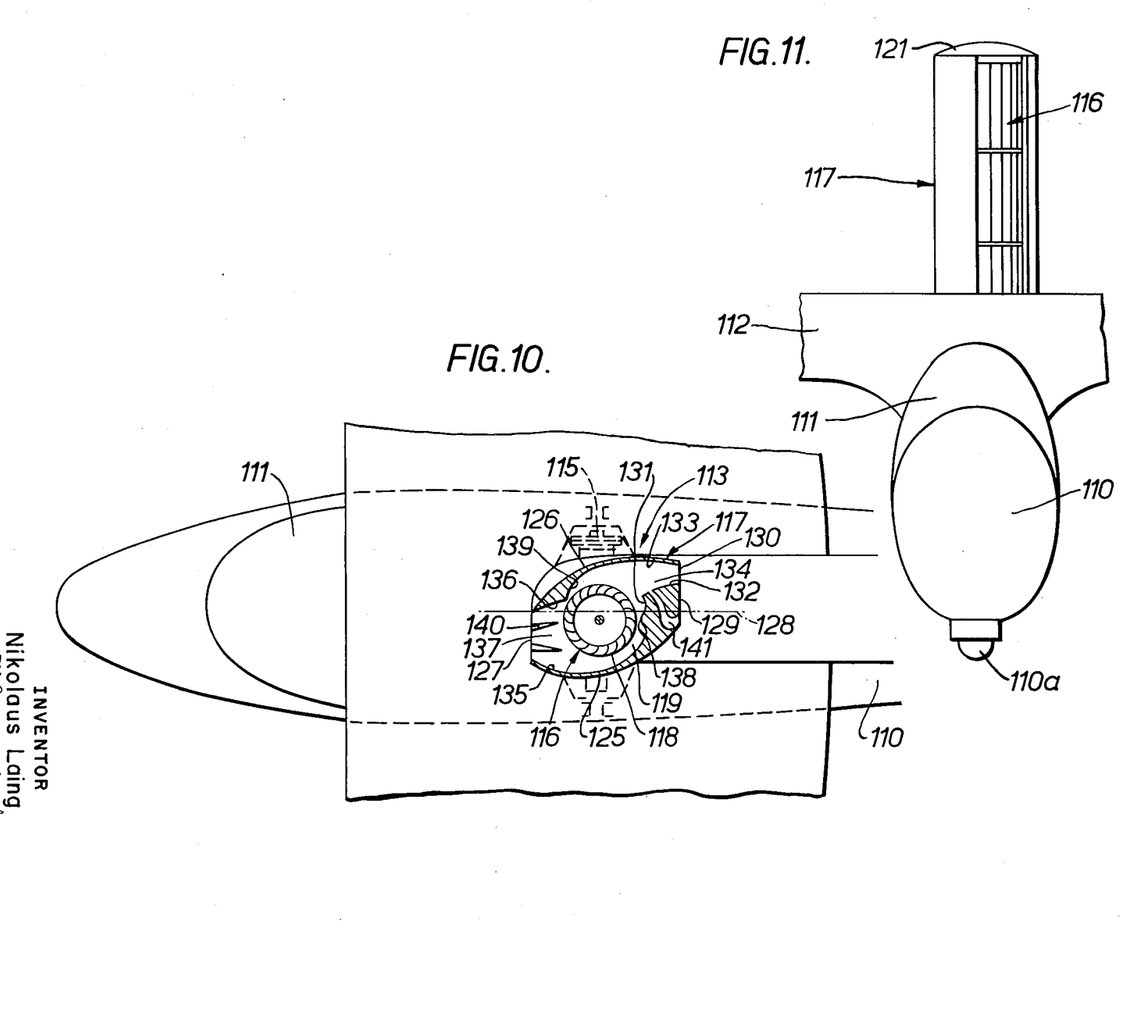
FIGURE 10 is a sectional plan view of the FIGURE 9 glider, the section being taken through the blower thereof in operative position, and the wings shown broken away.
FIGURE 11 is a front elevation of the FIGURE 9 glider, also with the wings cut off.

FIGURES 9, 10 and 11 illustrate a power-assisted glider. This aircraft comprises a fuselage 110 of more or less conventional form with a single-seat passenger compartment 111 forward, landing wheel 110a, a tail plane structure (not shown) aft, and a pair of wings 112 above the fuselage. The aircraft is provided with a power unit designated generally 113 pivotally mounted in the fuselage about a transverse pivot avis 114 which intersects both the centre of gravity of the aircraft as a whole, and also that of the power unit itself. By reason of its pivotal mounting the power unit 113 can be swung about the axis 114 under control of the pilot from an operative position (shown in FIGURES 10 and 11 and in full lines in FIGURE 9) to an inoperative position (shown chain-dotted in FIGURE 9) wherein it lies wholly within the fuselage 110.

The power unit 113 comprises a high speed twin-cylinder horizontally opposed air-cooled gasoline engine 115 driving directly a cylindrical bladed rotor 116 extending through a guide wall structure designated generally 117 rigid with the engine: for balance about the pivot axis 114 the engine lies to one side thereof and the rotor and guide wall structure to the other, and the arrangement is such that in the operative position of the power unit the rotor and guide wall structure project vertically above the fuselage over virtually the whole of their length. The rotor 116 comprises a series of blades 118 designed and arranged as described with reference to FIGURE 1 and supported upon a shaft 119 by means of discs 120 placed at intervals along the length of the rotor: the shaft 119 is mounted upon bearings at either end of the rotor, only the upper bearing, mounted in an end fairing cap 121 of the guide structure 117, being shown at 122.

The guide structure 117, which will now be described as seen in the operative position of the power unit 113, provides a pair of exterior convex wall surfaces 125, 126 extending rearwardly from a forward-facing inlet 127 offset to one side of the aircraft centre line (indicated at 128) to a rearward-facing wall 129 defining an outlet 130 offset to the other side of the centre line. The guide structure 117 provides also interior guide walls about the rotor 116, including a main guide wall portion 131 and outlet wall portion 132, and a guide wall portion 133 defining with the latter wall portion an outlet passageway 134 which converges from the rotor towards the outlet 130. It will be seen that the guide surfaces 133, 131 and 132 correspond respectively with the walls 10, 11 and 12 described with reference to FIGURE 1. The interior guide walls include also major and minor inlet guide surfaces 136 defining a divergent inlet passageway 137 leading from the inlet 127 to the rotor 116. The major inlet guide surface 135 sweeps round from one side of the inlet 127 up to the line 138 of nearest approach of the main guide wall portion 131 to the rotor; this surface 135 is concave to the rotor and well spaced therefrom except close to the line 138. The minor inlet guide surface 136 joins the guide wall portion 133 at its line 139 of nearest approach to the rotor 116. A pair of guide vanes 140 extend the length of the inlet 127: one function of these vanes is to protect the rotor 116 from damage by large objects entering the inlet. A bleed passage 141 is formed in the guide structure 117 to lead from the outlet passageway 134 and to discharge over the rear wall 129 of the structure, to inhibit separation of the boundary layer of air flow thereover, at the point where it would be most likely to occur.

In operation of the aircraft as a glider, the power unit is retracted within the fuselage, where it causes negligible drag. For power-assisted flight, the power unit is brought to operative position. Rotation of the rotor 116 sets up, by virtue of co-operation between the rotor and surrounding guide walls, a flow pattern as described with reference to FIGURES 1 and 3. The inlet passageway 137 has a slight diffuser-like effect upon air passing to the rotor 116, while the outlet passageway 134 acts as a convergent nozzle to increase the speed of the air leaving through the outlet 130. Drag is reduced by the bleed through passage 141 to the rear wall 129.

It will be seen that the rotor 116 is only slightly off the centre line 128, so that it can readily be arranged that the centre of gravity of the power unit 113 at a whole lies on the line 128. The very slight off-centredness of the thrust is of negligible importance: it could be eliminated if desired by slight changes in angular disposition of the guide surfaces.

It will be appreciated that modifications can be made in the aircraft described: various possible modifications are mentioned in the description relating to FIGURES 1 to 4. Other possible modifications include the driving of the rotors by gas turbine plant or rotary-piston engines, and further modifications will support themselves to those skilled in the art, on the basis of the foregoing description which, it is emphasized, is given by way of example only.

I claim:

1. An aircraft having a fuselage; a power unit supported on the fuselage; blower means including a rotor, means mounting the rotor on the fuselage for rotation about an axis located in a vertical longitudinal plane and lying at a substantial angle to the horizontal, means operatively connecting the rotor to the power unit to be driven thereby, said rotor comprising a series of blades extending over the length of the rotor and arranged in a ring about the axis to define an interior space clear of stationary guides, said blower means further comprising guide means extending the length of the rotor in spaced relation thereto and defining an inlet and an outlet, said guide means co-operating with the rotor on rotation thereof to induce a flow of air from the inlet through the path of the rotating blades to said interior space and thence again through the path of the rotating blades to the outlet, the rotor discharging directly through the outlet to provide thrust to the aircraft.

2. An aircraft having a fuselage; power means supported on the fuselage; and blower means driven by the power means to apply thrust to the aircraft; said blower means including a pair of similar rotors, means mounting the rotors in the fuselage for rotation in opposite directions about axes which extend at a substantial angle to the horizontal and which lie in vertical planes parallel to the centre line of the aircraft and symmetrically disposed relative thereto, each said rotor comprising a series of blades extending generally longitudinally of the rotor axis and arranged in a ring thereabout to define an interior space clear of stationary guides, said blower means further comprising guide walls extending over the length of the rotors in spaced relation thereto and defining separate inlets therefor at opposite sides of the fuselage and a common outlet for the rotors at the rear of the fuselage and aligned on the centre line of the aircraft, said rotors each co-operating with the guide walls on rotor rotation to induce a flow of air from the respective inlet through the path of the rotating blades into said interior space and thence again through the path of the rotating blades to the common outlet.

3. An aircraft having a fuselage; a blower unit, means mounting the blower unit on the fuselage for pivotal movement in the central vertical plane of the aircraft between a generally horizontal retracted inoperative position in the fuselage and an operative position in which it projects therefrom; said blower unit comprising a rotor, means mounting the rotor for rotation about an axis lying in a vertical plane, said rotor including a series of blades extending generally longitudinally of the rotor axis and in a ring thereabout to define an interior space clear of stationary guides, said blower unit further including a power source driving the rotor and guide means extending the length of the rotor in spaced relation thereto and defining an inlet thereto and an outlet therefrom, said guide means co-operating with the rotor on rotation thereof in the operative position of the blower unit to induce a flow of air from the inlet through the path of the rotating blades to said interior space and thence again through the path of the rotating blades to the outlet, the rotor discharging directly through the outlet to provide thrust to the aircraft.

No references cited.

FERGUS S. MIDDLETON, *Primary Examiner.*
ANDREW H. FARRELL, MILTON BUCHLER,
*Examiners.*